US010865599B2

(12) United States Patent
Moran et al.

(10) Patent No.: US 10,865,599 B2
(45) Date of Patent: Dec. 15, 2020

(54) SEAL ASSEMBLY FOR A GALLEY DOOR OF A GALLEY AND METHOD OF ASSEMBLING A GALLEY WITH A SEAL ASSEMBLY

(71) Applicant: THE BOEING COMPANY, Chicago, IL (US)

(72) Inventors: Thomas Joseph Moran, Lake Stevens, WA (US); Wayne Joseph Stanley, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 243 days.

(21) Appl. No.: 15/637,383

(22) Filed: Jun. 29, 2017

(65) Prior Publication Data
US 2019/0002105 A1    Jan. 3, 2019

(51) Int. Cl.
| | | |
|---|---|---|
| *E06B 7/215* | (2006.01) | |
| *E06B 7/20* | (2006.01) | |
| *B64D 11/04* | (2006.01) | |
| *B64D 11/00* | (2006.01) | |

(52) U.S. Cl.
CPC .......... *E06B 7/215* (2013.01); *B64D 11/0007* (2013.01); *E06B 7/20* (2013.01); *B64D 11/04* (2013.01)

(58) Field of Classification Search
CPC ... E06B 7/20; E06B 7/215; E06B 7/18; B64D 11/0007; B64D 11/04
See application file for complete search history.

(56) References Cited

U.S. PATENT DOCUMENTS

| | | | | | |
|---|---|---|---|---|---|
| 1,443,295 | A | * | 1/1923 | Tripp | E06B 7/18 49/307 |
| 2,033,241 | A | * | 3/1936 | Hawk | E06B 7/20 49/310 |
| 2,126,726 | A | * | 8/1938 | Brunker | E06B 7/20 49/311 |
| 2,566,070 | A | * | 8/1951 | Rhodes | E06B 7/20 49/314 |
| 2,602,973 | A | * | 7/1952 | Watson | E06B 7/20 16/94 R |
| 2,786,244 | A | * | 3/1957 | Rapin | E06B 7/20 49/312 |
| 2,802,247 | A | * | 8/1957 | Anderson | E06B 7/20 49/314 |
| 2,929,116 | A | * | 3/1960 | Isbister | E06B 7/20 49/314 |

(Continued)

FOREIGN PATENT DOCUMENTS

| | | | |
|---|---|---|---|
| EP | 0873898 A1 | 10/1998 | |
| WO | WO2016/066577 | * 5/2016 | E06B 7/215 |

*Primary Examiner* — Justin B Rephann
(74) *Attorney, Agent, or Firm* — The Small Patent Law Group LLC; Jay J. Hoette

(57) ABSTRACT

A seal assembly for use with a door within a frame of a galley of an aircraft includes a seal configured to be movably coupled to the door and a seal holder holding the seal. The seal assembly includes a biasing mechanism coupled to the seal holder and configured to hold the seal in an open position by applying a biasing force to the seal holder. An activation mechanism is operably coupled to the seal holder that overcomes the biasing force to move the seal from the open position to a sealed position.

31 Claims, 6 Drawing Sheets

(56) References Cited

U.S. PATENT DOCUMENTS

| | | | | |
|---|---|---|---|---|
| 3,118,193 A * | 1/1964 | Johannes | E06B 7/20 | 49/310 |
| 3,694,962 A * | 10/1972 | McDonald | E06B 7/23 | 220/232 |
| 3,871,133 A * | 3/1975 | Ellingson, Jr. | E06B 7/20 | 49/308 |
| 4,323,110 A * | 4/1982 | Rubbright | F25D 23/12 | 165/201 |
| 4,406,088 A * | 9/1983 | Berndt, Jr. | E06B 7/215 | 49/309 |
| 4,479,330 A * | 10/1984 | Muller | E06B 7/20 | 49/303 |
| 4,805,345 A * | 2/1989 | Ohi | E06B 7/215 | 49/308 |
| 5,454,192 A * | 10/1995 | Adler | E06B 7/20 | 49/307 |
| 5,655,595 A * | 8/1997 | Westbrooks, Jr. | A47J 39/006 | 165/48.1 |
| 6,112,466 A * | 9/2000 | Smith | E06B 7/18 | 160/40 |
| 6,167,937 B1 * | 1/2001 | Williams | E06B 7/215 | 160/40 |
| 8,561,351 B2 | 10/2013 | Heidrich et al. | | |
| 8,839,558 B2 | 9/2014 | Heidrich et al. | | |
| 8,925,250 B2 * | 1/2015 | Parker | E06B 7/21 | 49/310 |
| 9,453,368 B2 | 9/2016 | Burd | | |
| 2004/0010973 A1 * | 1/2004 | Lio | E06B 7/20 | 49/306 |
| 2008/0001031 A1 * | 1/2008 | Doebertin | B64D 11/04 | 244/118.1 |
| 2009/0077895 A1 * | 3/2009 | Tshai | E06B 7/215 | 49/316 |
| 2013/0257067 A1 | 10/2013 | Burd | | |
| 2014/0117161 A1 * | 5/2014 | Harter | B64D 11/0023 | 244/129.5 |
| 2015/0061302 A1 * | 3/2015 | Burd | E06B 7/20 | 292/307 R |
| 2018/0291673 A1 * | 10/2018 | Dintheer | E06B 7/20 | |
| 2018/0291674 A1 * | 10/2018 | Dintheer | E06B 7/215 | |

\* cited by examiner

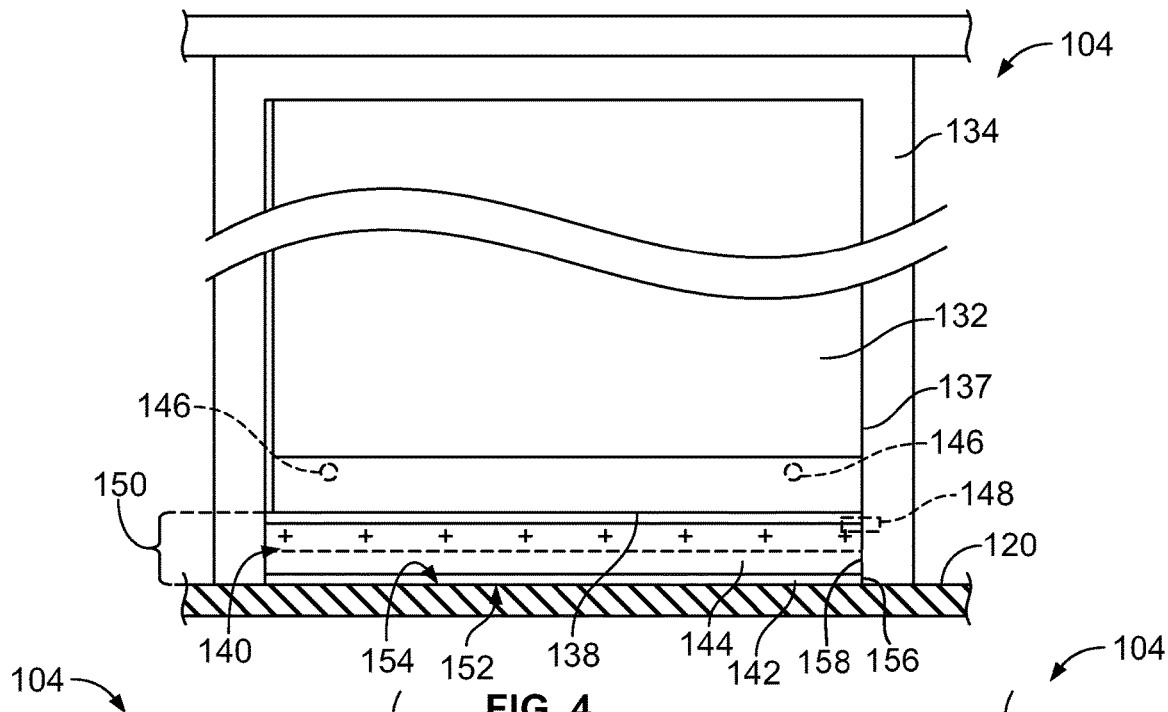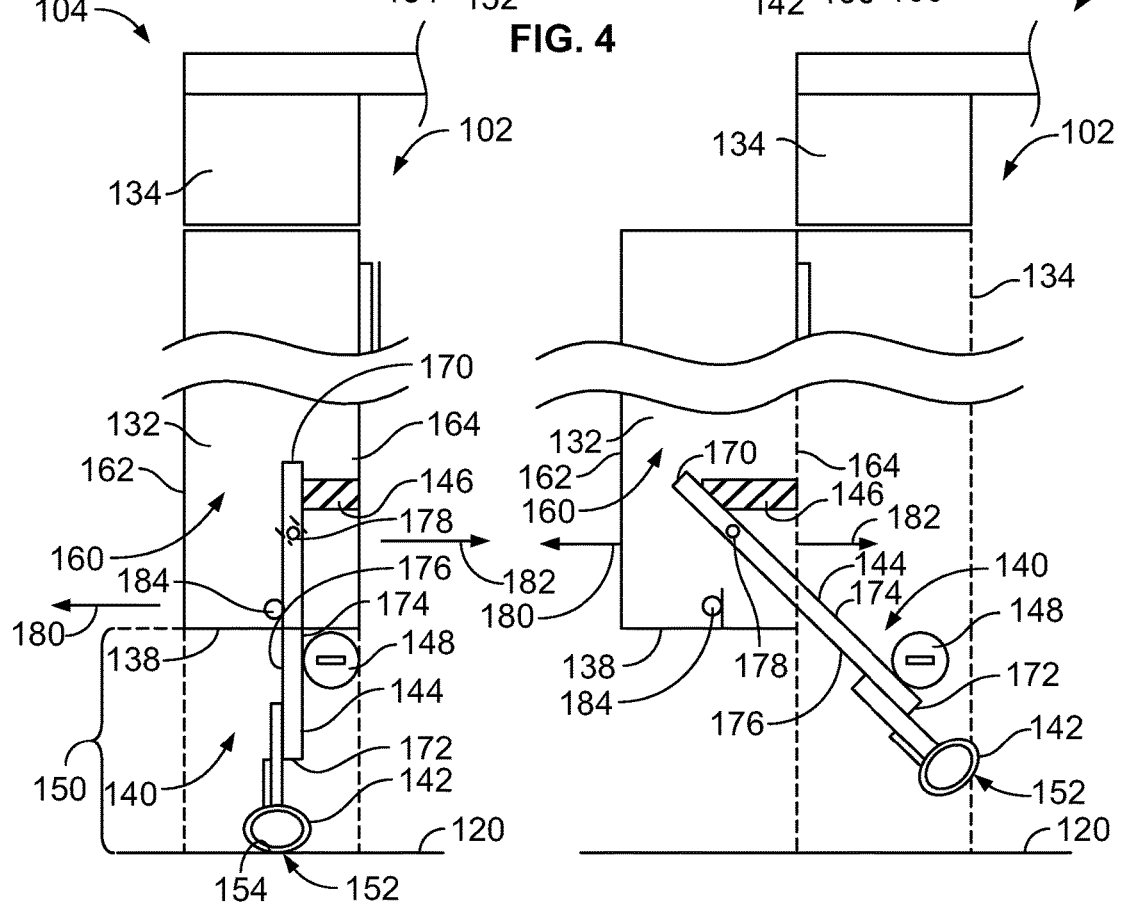

SEAL ASSEMBLY FOR A GALLEY DOOR OF A GALLEY AND METHOD OF ASSEMBLING A GALLEY WITH A SEAL ASSEMBLY

BACKGROUND

The present disclosure relates generally to seal assemblies for galley doors and methods of assembling galleys with seal assemblies.

Aircraft typically include multiple galleys to store food and beverages on the aircraft. The food and beverages are typically stored in galley carts which are transported to the aircraft and stored in refrigerated galley cart compartments in the galleys. In some known galleys, the refrigerated compartments include doors to close the galley cart compartments for air-over-cart cooling of the galley carts. However, sealing of the door is difficult and typically there is air leakage around the door into the galley space of the aircraft. The ingestion of warm ambient air into the chilled air system causes significant inefficiencies in power consumption and cooling performance. Additionally, leakage of cold air into the galley space causes cold galley floors, which may be uncomfortable for flight crew working in the galley space.

Conventional galleys use blade seals or brush seals at the bottom of the door to seal to the floor of the galley. However, such blade seals and brush seals do not completely seal off the airflow at the sides and at the bottom of the door. For example, a significant amount of leakage occurs between the seal and the door frame due to the shape of the seal being curved and extending beyond the door frame leaving a gap or opening for leakage. Brush seals allow some airflow directly through the brush as well as at the sides and the bottom and over time may wear and lose bristles. Blade seals continuously rub against the floor during opening and closing of the door causing wear to the seal. The blade seals may structurally fail over time because of constantly flexing back and forth as the door is opened and closed. Additionally, the blade seals are typically hard rubber to prevent excessive wear, but the hard rubber is not compressible against the floor creating a poor seal at the floor. The edges of the blade seals are susceptible to damage, such as from tearing or breaking, leading to additional leakage at the sides.

SUMMARY

In accordance with one embodiment, a seal assembly is provided for use with a door within a door frame of a galley of an aircraft that includes a seal configured to be movably coupled to the door and a seal holder holding the seal. The seal assembly includes a biasing mechanism coupled to the seal holder and configured to hold the seal in an open position by applying a biasing force to the seal holder. An activation mechanism is operably coupled to the seal holder that overcomes the biasing force to move the seal from the open position to a sealed position.

In another embodiment, a galley door is provided received within a door frame of a galley of an aircraft that includes a door body having a front wall for facing a galley space exterior of the galley, a rear wall for facing a galley cart compartment of the galley and a bottom for facing a floor of the galley space. The galley door includes a seal assembly provided at the bottom of the door body including a seal holder and a seal coupled to the seal holder. The seal holder is movably coupled to the door body. The seal assembly includes a biasing mechanism coupled to the seal holder configured to hold the seal in an open position by applying a biasing force to the seal holder. The seal assembly includes an activation mechanism operably coupled to the seal holder configured to overcome the biasing force to move the seal from the open position to a sealed position.

In another embodiment, a galley for an aircraft is provided including a cart compartment configured to be cooled, a door frame defining a front wall of the cart compartment and a door coupled to the door frame at a hinge having a bottom for facing a floor of the galley. The galley includes a seal assembly provided at the bottom of the galley door including a seal holder and a seal coupled to the seal holder. The seal holder is movably coupled to the door. The seal assembly includes a biasing mechanism coupled to the seal holder configured to hold the seal in an open position by applying a biasing force to the seal holder. The seal assembly includes an activation mechanism operably coupled to the seal holder configured to overcome the biasing force to move the seal from the open position to a sealed position.

In a further embodiment, a method of assembling a galley with a seal assembly including a seal holder, a seal coupled to the seal holder, and a biasing mechanism coupled to the seal holder includes coupling a door to a door frame above a floor of the galley to close a galley cart compartment that is configured to be opened and closed. The method includes coupling the seal holder to the bottom of the door such that the seal is configured to seal against the floor, coupling the biasing mechanism to the door and to the seal holder to hold the seal in an open position by applying a biasing force to the seal holder, and coupling an activation mechanism proximate to the door frame to interact with the seal holder to overcome the biasing force to move the seal from the open position to a sealed position against the floor.

The features and functions that have been discussed can be achieved independently in various embodiments or may be combined in yet other embodiments, further details of which can be seen with reference to the following description and drawings.

BRIEF DESCRIPTION OF THE DRAWINGS

FIG. 4 is a front view of a portion of the galley showing a door in a closed position illustrating a seal assembly in accordance with an exemplary embodiment in a sealed position.

FIG. 5 is a cross-sectional view of a portion of the galley showing the seal assembly in accordance with an exemplary embodiment in a sealed position.

FIG. 6 is a cross-sectional view of a portion of the galley showing the seal assembly shown in FIG. 5 in an open position.

DETAILED DESCRIPTION

Figure 1:
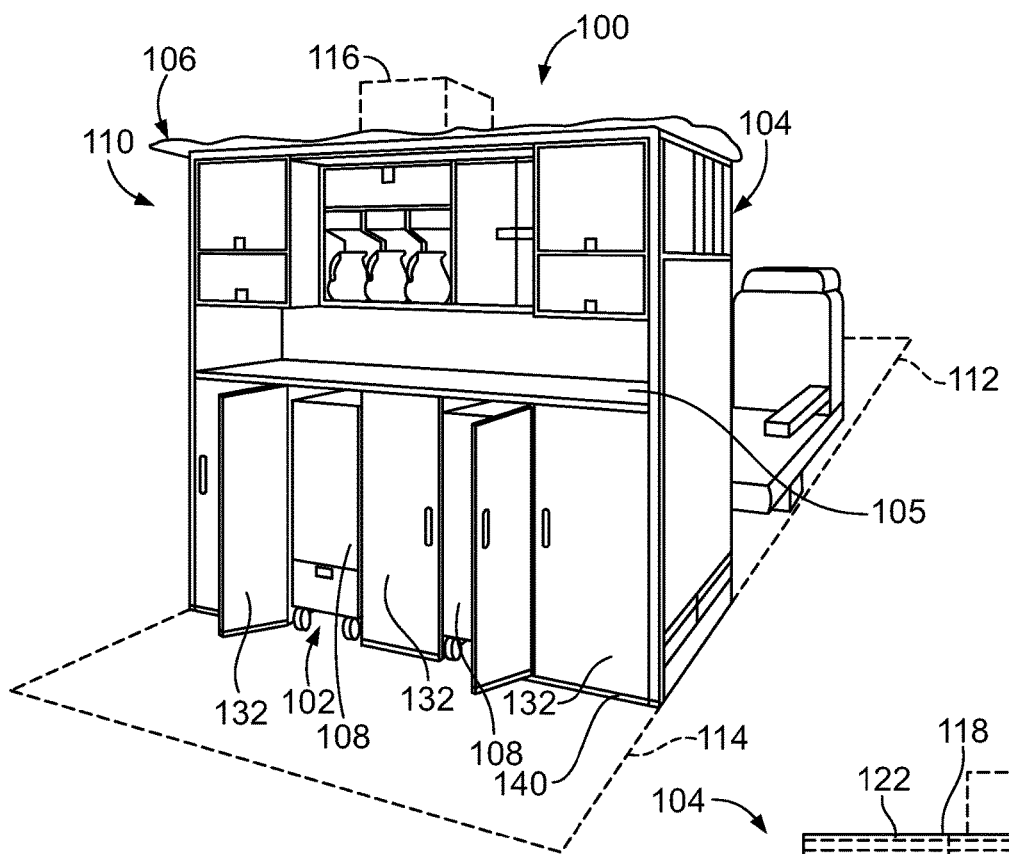
FIG. 1 is a schematic illustration of an exemplary galley system for an aircraft.

The embodiments described herein provide a seal assembly for a galley door that operates efficiently, seals more effectively and has reduced wear compared to conventional door seals. Described herein are various embodiments of a seal assembly for a galley of an aircraft configured to seal a door of the galley to prevent airflow leakage into or out of the galley cart compartment. Various embodiments provide a seal assembly configured to be movably coupled to the door to open the seal assembly during opening and closing of the door to prevent wear of the seal. For example, the seal may be lifted and lower vertically between open and sealed positions or the seal may be pivoted between the open and sealed positions. Various embodiments provide a mechanism for automatically opening and closing the seal as the door is opened and closed.

The following detailed description of certain embodiments will be better understood when read in conjunction with the appended drawings. It should be understood that the various embodiments are not limited to the arrangements and instrumentality shown in the drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

FIG. 1 is a schematic illustration of an exemplary galley system 100 for an aircraft 106. The galley system 100 is used to cool galley carts 108 held in cart compartments 102 of a galley 104. The galley 104 defines one or more cart compartments 102, which are typically arranged below a counter 105 of the galley 104. The cart compartments 102 are closed by doors 132 having seal assemblies 140 for sealing the cart compartments 102, such as at the floor and/or around the door frames. Each cart compartment 102 may hold any number of galley carts 108. The galleys 104 may be used for the storage and/or preparation of food or beverages. The galley 104 is positioned within a cabin 110 of the aircraft 106, and the cabin of the aircraft 106 is divided into a passenger area 112 and a galley area 114. The galley area 114 has a working area for the galley crew forward of the galley 104 where the cart compartments 102, counter 105 and cabinets or storage bins may be accessed.

As used herein a "cart compartment" is an insulated volume that is utilized to store one or more galley carts on the aircraft 106. A "galley cart", as used herein, is a portable device that is used to store food and/or beverages that are transported from a caterer to the aircraft 106 or from the cart compartments 102 to other parts of the aircraft 106 for serving the food and/or beverages. The galley carts may include wheels, however some galley carts may be hand carried boxes in some embodiments.

The galley system 100 includes a cooling system having one or more heat exchangers 116 that provides cooled air for the galley carts 108 in the cart compartment 102. The cooled air from the heat exchangers 116 flows into and out of the cart compartments 102 through supply or return ducts in the rear wall of the galley 104.

Figure 2:
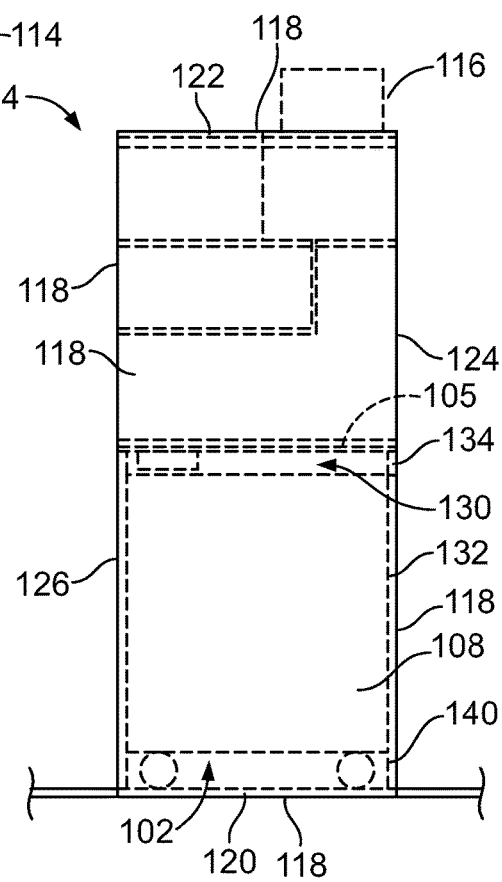
FIG. 2 is a side view of the galley in accordance with an exemplary embodiment.
Figure 3:
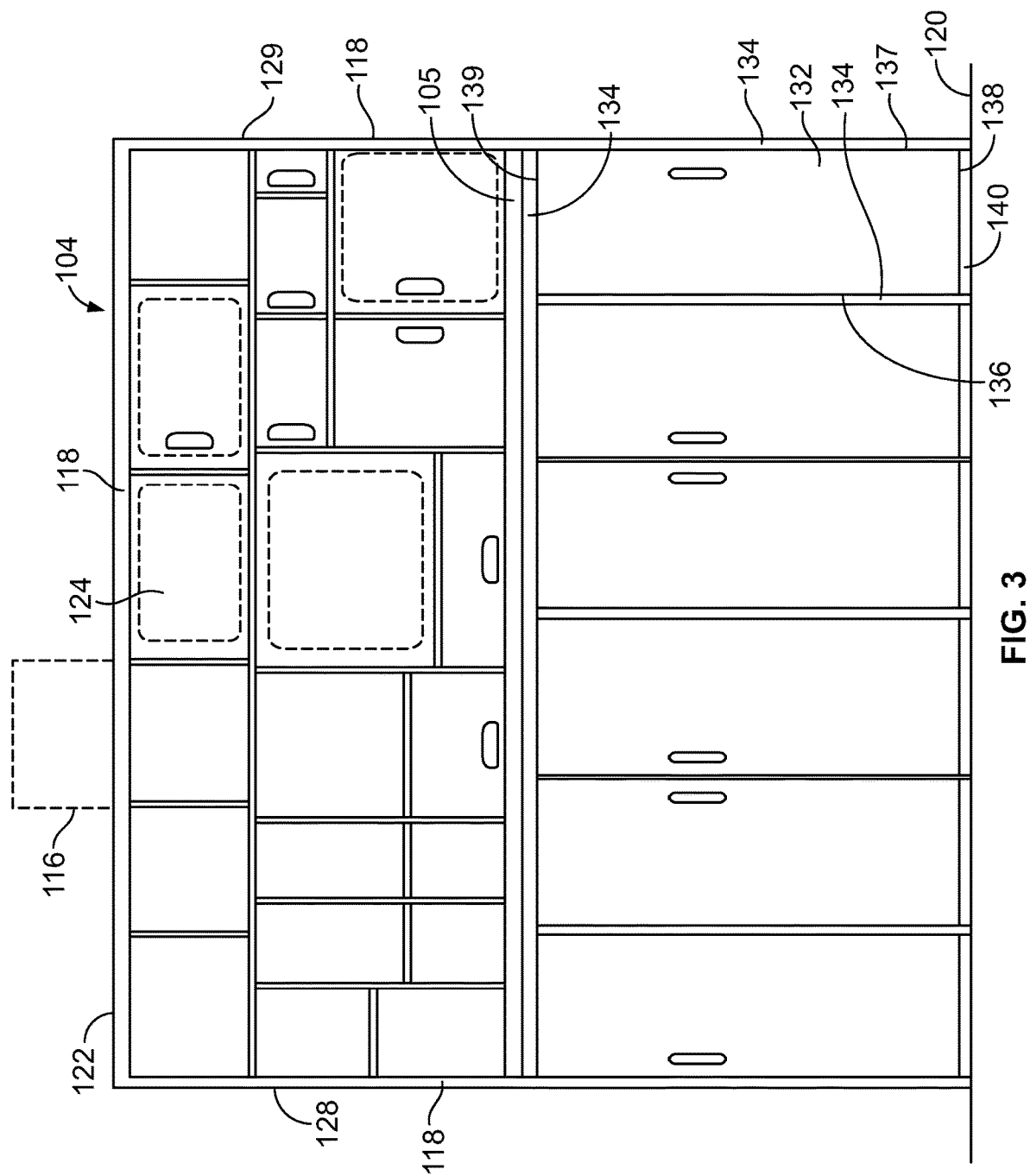
FIG. 3 is a front view of the galley in accordance with an exemplary embodiment.

FIG. 2 is a side view of the galley 104 in accordance with an exemplary embodiment. FIG. 3 is a front view of the galley 104 in accordance with an exemplary embodiment. The galley 104 includes walls 118 or partitions defining a bottom 120, a top 122, a front 124, a rear 126 opposite the front 124, and opposite sides 128, 129 (which may also be referred to as bottom wall 120, top wall 122, front wall 124, rear wall 126, and side walls 128, 129). The counter 105 extends between the sides 128, 129 at a height approximately centered between the bottom 120 and the top 122. The bottom 120 may be defined by a floor of the cabin of the aircraft and may be referred to hereinafter as a floor 120.

The cart compartment 102 is positioned below the counter 105 and may be at least partially defined by the walls 118 of the galley 104. The cart compartment 102 defines a cavity 130 configured to receive the galley carts 108. In an exemplary embodiment, the doors 132 are provided at the front 124 of the galley 104 that close the cart compartment 102. The doors 132 are received in door frames 134 and, in the illustrated embodiment, are hingedly coupled to the door frames 134 at one of the sides 136, 137 of the corresponding door 132. The doors 132 are used to hold the galley carts 108 in the cart compartment 102. The doors 132 are used to contain the cooled air in the cart compartment 102. The doors 132 may provide thermal insulation. A bottom 138 of each door 132 faces the floor 120. In an exemplary embodiment, when the galley carts 108 are positioned in the cavity 130, a space is defined about the galley cart 108, such as in front of the galley carts 108, behind the galley carts 108, above the galley carts 108, and the like to allow air to flow around the galley carts 108 in the space.

The galley 104 includes a seal assembly 140 on each door 132 for sealing the cart compartment 102. In the illustrated embodiment, the seal assembly 140 is provided at the bottom 138 of the door 132 to seal between the bottom 138 of the door and the floor 120; however, the seal assembly 140 may additionally or alternatively be provided at other areas of the door 132, such as along the sides 136, 137 or a top 139 of the door 132. Optionally, multiple seal assemblies 140 may be provided to seal against multiple surfaces. In other various embodiments, the seal assembly 140 may be coupled to the door frame 134 rather than the door 132 to seal between the door frame 132 and the door 132, such as at the space between the bottom 138 of the door 132 and the floor 120.

FIG. 4 is a front view of a portion of the galley 104 showing the door 132 in a closed position illustrating the seal assembly 140 in a sealed position between the bottom 138 of the door 132 and the floor 120. The seal assembly 140 includes a seal 142 configured to be movably coupled to the door 132 and a seal holder 144 holding the seal 142. The seal assembly 140 includes at least one biasing mechanism 146 coupled to the seal holder 144 and configured to apply a biasing force to the seal holder 144. The seal assembly 140 includes at least one activation mechanism 148 operably engaging the seal holder 144 to hold the seal 142 in the sealed position.

The biasing mechanism 146 is configured to hold the seal 142 in an open position by applying a biasing force to the seal holder 144. For example, the biasing mechanism 146 may open the seal assembly 140 prior to opening the door 132 or simultaneously as the door 132 is being opened. The activation mechanism 148 is configured to overcome the biasing force to move the seal 142 from the open position to the sealed position after closing the door 132 or simultaneously as the door 132 is being closed, such as immediately before the door 132 is moved to the closed position. For example, as the door 132 is being closed, the seal assembly 140 remains open but as the door 132 approaches the closed position, the activation mechanism 148 may be used to move the seal 142 to the sealed position.

In the illustrated embodiment, the seal assembly 140 is provided at the bottom 138 of the door 132 and closes off a space 150 between the bottom 138 of the door 132 and the floor 120. In an exemplary embodiment, at least a portion of the seal holder 144 may extend into the door 132 and at least a portion of the seal holder 144 may extend below the bottom 138 of the door 132. The seal 142 is provided at the bottom of the seal holder 144. The seal 142 includes a seal interface 152 configured to engage a sealing surface 154 along the floor 120. In an exemplary embodiment, side edges 156 of the seal 142 are configured to engage sealing surfaces 158 along the door frame 134 that extends between the floor 120 and the bottom of the door 132 to provide side sealing along the side of the seal 142 and prevent side leakage at the door frame 134. In the illustrated embodiment, the seal assembly 140 includes a plurality of biasing mechanisms 146 spaced apart along a width of the seal assembly 140 for biasing against different portions of the seal holder 144. In the illustrated embodiment, the activation mechanism 148 is coupled to the door frame 134 at the side 137 of the door 132. A portion of the activation mechanism 148 is configured to extend into the door 132 to engage the seal holder 144 for closing the seal assembly 140 when the door 132 is closed. In other various embodiments, the seal assembly 140 may include multiple activation mechanisms 148 configured to engage different portions of the seal holder 144.

In various embodiments, another seal assembly (not shown) may be provided at the sides of the door 132 for sealing at the door frame 134 in the space between the floor 120 and the bottom 138 of the door 132, such as at the sealing surfaces 158. In various embodiments, the seal assembly may be coupled to the door and movable with the door 132. In other embodiments, the seal assembly may be coupled to the door frame 134. The seal assembly may seal against the seal 142, the seal holder 144 or another element. The seal assembly may be movable between opened and sealed positions to reduce wear. For example, the seal assembly may be automatically moved between the open and sealed positions by the opening and closing actions of the door 132.

FIG. 5 is a cross-sectional view of a portion of the galley 104 showing the door 132 in the door frame 134 and illustrating an exemplary embodiment of the seal assembly 140 in the space 150 between the bottom 138 of the door 132 and the floor 120. The door 132 is shown in a closed position and the seal 142 is shown in the sealed position. FIG. 6 is a cross-sectional view of a portion of the galley 104 showing the door 132 in a partially opened or partially closed position showing the seal 142 in an open position.

The door 132 includes a cavity 160 between a front wall 162 and a rear wall 164 of the door 132. The front wall 162 is configured to face a galley space exterior of the galley 104 and the rear wall 164 is configured to face the cart compartment 102 of the galley 104. A portion of the seal assembly 140 is received in the cavity 160.

The seal holder 144 extends between a top 170 and a bottom 172. The top 170 is received in the cavity 160 of the door 132. The bottom 172 extends into the space 150 below the bottom 138 of the door 132. In an exemplary embodiment, the seal holder 144 is a rigid plate having an interior 174 and an exterior 176. The interior 174 faces the cart compartment 102. The seal holder 144 may be manufactured from a plastic material, a metal material, a rubber material, or another rigid material. The seal holder 144 is movably coupled to the door 132. For example, in the illustrated embodiment, the seal holder 144 is pivotably coupled to the door 132 at a pivot 178, such as a pivot pin. The pivot 178 may be located proximate to the top 170.

The seal 142 is coupled to the bottom 172 of the seal holder 144. Optionally, the seal 142 may be coupled to the exterior 176 of the seal holder 144. The seal 142 may additionally or alternatively be coupled to the interior 174 of the seal holder 144. In various embodiments, the seal 142 is manufactured from a rubber material; however, the seal may be manufactured from other materials in alternative embodiments. In an exemplary embodiment, the seal 142 is a bulb seal having a hollow interior; however, other types of seals 142 may be provided in alternative embodiments, such as a flexible blade seal. The seal 142 is compressible at the seal interface 152 to provide an effective seal with the sealing surface 154. In an exemplary embodiment, because the seal 142 is moved away from the floor 120 to the open position (FIG. 6) when the door 132 is opened and closed, the seal 142 does not drag along the floor 120 during opening and closing of the door 132. As such, the seal 142 is not susceptible to wear as is problematic with conventional blade seals and brush seals. When the seal 142 is closed and returned to the sealed position (FIG. 5), the seal is aligned with and contained within the door frame 134 to seal against the door frame 134 and prevent side leakage at the sides of the seal 142, which is a problem with conventional blade seals.

The biasing mechanism 146 is coupled to the door 132, such as in the cavity 160. The biasing mechanism 146 engages and is biased against the seal holder 144. The biasing mechanism 146 is used to open the seal assembly 140 by moving the seal 142 to the open position (FIG. 6) by applying a biasing force to the seal holder 144. The seal holder 144 may be rotated between approximately 15° and 45° to elevate or lift the seal 142 off of the floor 120 to prevent dragging and wear. The angle of lift needed may depend on the radius length of the seal assembly 140 and/or the seal compression length of the seal 142. In the illustrated embodiment, the biasing mechanism 146 is provided at the rear wall 164 of the door 132. The biasing mechanism 146 biases against the interior 174 of the seal holder 144 to push the seal assembly 140 open. The biasing mechanism 146 may be a spring, such as a coil spring configured to push outward against the seal holder 144. Other types of biasing mechanisms 146 may be used in alternative embodiments. In other various embodiments, the biasing mechanism 146 may pull against the seal holder 144 rather than push against the seal holder 144. In the illustrated embodiment, the biasing mechanism 146 pushes against the seal holder 144 proximate to the top 170. For example, the biasing mechanism 146 may be located above the pivot 178. The biasing mechanism 146 is configured to apply the biasing force in a door opening direction 180. The biasing mechanism 146 swings the seal 142 toward the cart compartment 102. As such, the door 132 tends to move away from the seal 142 at the sealing surface 154 as the door 132 opens. The biasing mechanism 146 may be located at other locations in alternative embodiments, such as to move the seal holder 144 and the seal 142 in a different direction, such as in a door closing direction 182.

The activation mechanism 148 is positioned in the galley 104 to operably engage the seal holder 144, such as to close the seal assembly 140. In an exemplary embodiment, the activation mechanism 148 is coupled to the door frame 134 and extends into the space 150 and/or into the cavity 160 to engage the seal holder 144 by the door closing action as the door 132 is being closed. The door 132 and the seal holder 144 are configured to be moved away from the activation mechanism 148 when the door 132 is opened as the activation mechanism 148 remains fixed to the door frame 134.

In the illustrated embodiment, the activation mechanism 148 is a post or peg configured to engage the interior 174 of the seal holder 144 to overcome the biasing force of the biasing mechanism 146 to move the seal 142 from the open position (FIG. 6) back to the sealed position (FIG. 5). For example, at some point during closing of the door 132, the opened seal assembly 140 engages the activation mechanism 148 and the activation mechanism 148 pushes the seal holder 144 closed. The point at which the seal assembly 140 engages the activation mechanism 148 may be when the door 132 is very nearly closed, such as within the last 10.0 cm of travel of the door 132, within the last 5.0 cm of travel of the door 132, or less. In an exemplary embodiment, the seal holder 144 is pivoted closed about the pivot 178; however, the seal holder 144 may have other closing movements in alternative embodiments.

In the illustrated embodiment, the door 132 includes a travel stop 184 for limiting closing of the seal assembly 140. The travel stop 184 may be provided in the cavity 160 of the door 132. As the seal holder 144 is pivoted closed by the activation mechanism 148, the seal holder 144 may engage the travel stop 184 to limit further movement of the seal holder 144. The travel stop 184 engages the exterior 176 of the seal holder 144. In the illustrated embodiment, the travel stop 184 is positioned below the pivot 178. When the door 132 is closed and the seal 142 is in the sealed position, the seal holder 144 is captured and confined between the activation mechanism 148 and the travel stop 184 to restrict forward or rearward movement. The door 132 may include another travel stop to limit opening of the seal assembly 140 in other various embodiments.

Figure 7:
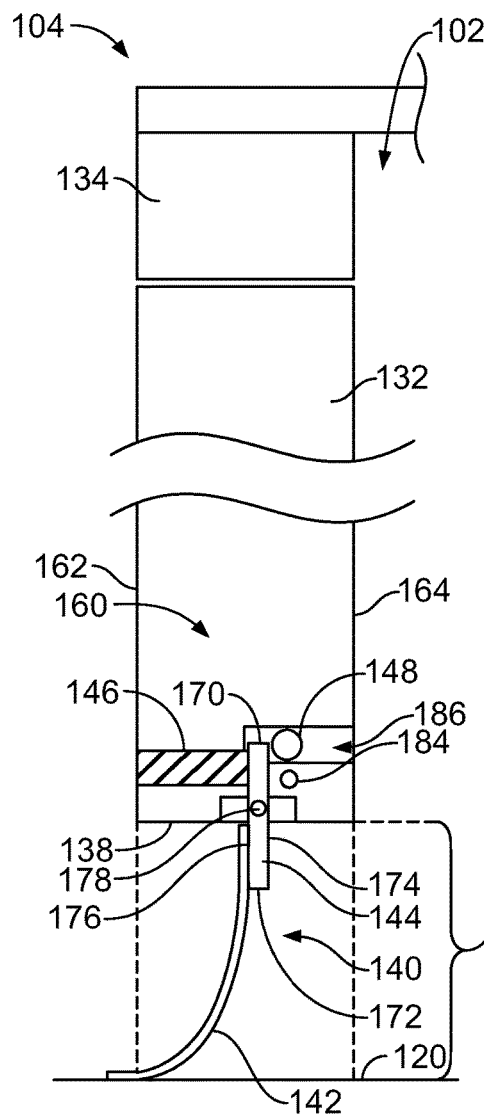
FIG. 7 is a cross-sectional view of a portion of the galley showing the seal assembly in accordance with an exemplary embodiment in a sealed position.
Figure 8:
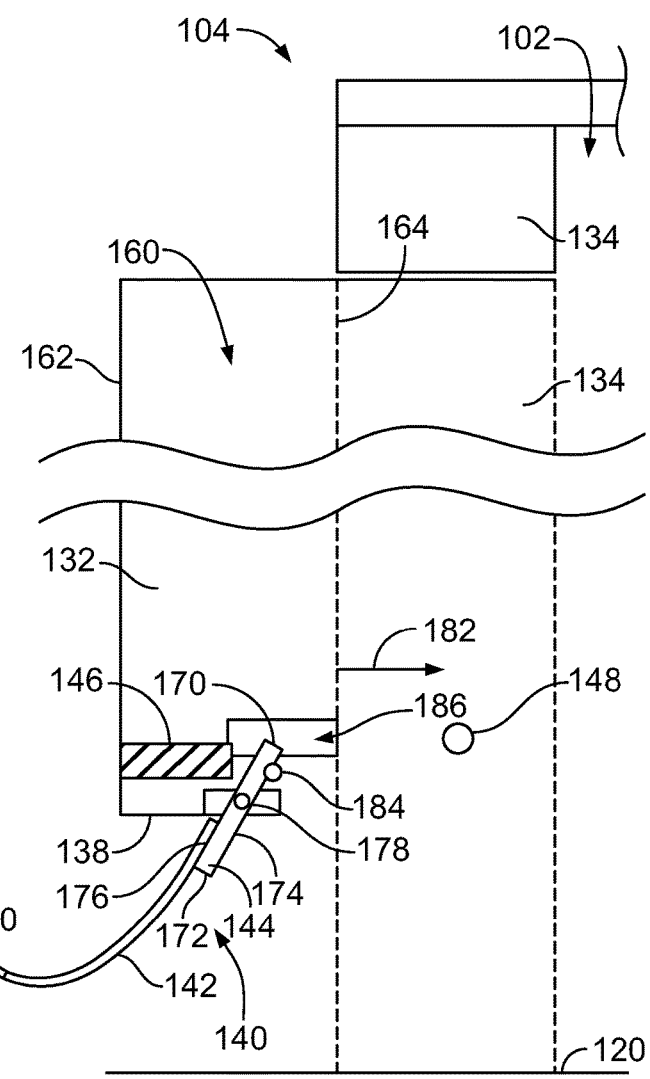
FIG. 8 is a cross-sectional view of a portion of the galley showing the seal assembly shown in FIG. 7 in an open position.

FIG. 7 is a cross-sectional view of a portion of the galley 104 showing the door 132 in the door frame 134 and illustrating an exemplary embodiment of the seal assembly 140 in the space 150 between the bottom 138 of the door 132 and the floor 120. The seal assembly 140 is similar to the embodiment of the seal assembly 140 shown in FIGS. 5 and 6 and operates in a similar manner; however, the seal 142 in the illustrated embodiment is a blade seal rather than a bulb seal and the seal holder 144 is configured to be rotated forward rather than rearward. In FIG. 7, the door 132 is shown in a closed position and the seal 142 is shown in the sealed position. FIG. 8 is a cross-sectional view of a portion of the galley 104 showing the door 132 in a partially opened or partially closed position showing the seal 142 in an open position.

The top 170 of the seal holder 144 is received in the cavity 160 of the door 132 and the bottom 172 extends into the space 150 below the bottom 138 of the door 132. The seal holder 144 pivotably coupled to the door 132 at the pivot 178. The seal 142 is coupled to the bottom 172 of the seal holder 144. In the illustrated embodiment, the seal 142 is a flexible blade seal. In an exemplary embodiment, because the seal 142 is moved away from the floor 120 to the open position (FIG. 8) when the door 132 is opened and closed, the seal 142 does not drag along the floor 120 during opening and closing of the door 132. As such, the seal 142 is not susceptible to wear as is problematic with conventional blade seals and brush seals.

The biasing mechanism 146 is coupled to the door 132 in the cavity 160 and is biased against the seal holder 144. The biasing mechanism 146 is used to open the seal assembly 140 by moving the seal 142 to the open position (FIG. 8) by applying a biasing force to the seal holder 144. The seal holder 144 may be rotated between approximately 15° and 45° to elevate or lift the seal 142 off of the floor 120 to prevent dragging and wear. The angle of lift needed may depend on the radius length of the seal assembly 140 and/or the seal compression length of the seal 142. In the illustrated embodiment, the biasing mechanism 146 is provided at the front wall 162 of the door 132. The biasing mechanism 146 biases against the exterior 176 of the seal holder 144 to push the seal assembly 140 open. In the illustrated embodiment, the biasing mechanism 146 may be located above the pivot 178. The biasing mechanism 146 is configured to apply the biasing force in the door closing direction 182. The biasing mechanism 146 swings the seal 142 away from the cart compartment 102 such that the seal 142 is configured to be dragged closed in the closing direction of the door 132 to limit binding or stubbing of the seal 142 during opening and closing of the door 132.

In the illustrated embodiment, the door 132 includes the travel stop 184, which is used to limit opening of the seal assembly 140. The travel stop 184 may be provided in the cavity 160 of the door 132. As the seal holder 144 is pivoted open by the biasing mechanism 146, the seal holder 144 may engage the travel stop 184 to limit further movement of the seal holder 144. The travel stop 184 engages the interior 174 of the seal holder 144. In the illustrated embodiment, the travel stop 184 is positioned above the pivot 178. The door 132 may include a travel stop to limit closing of the seal assembly 140 in other various embodiments.

The activation mechanism 148 is positioned in the galley 104 to operably engage the seal holder 144, such as to close the seal assembly 140. In an exemplary embodiment, the activation mechanism 148 is coupled to the door frame 134 and extends into a pocket 186 in the cavity 160 to engage the seal holder 144 when the door 132 is moved to the closed position. The door 132 and the seal holder 144 are configured to be moved away from the activation mechanism 148 when the door 132 is opened as the activation mechanism 148 remains fixed to the door frame 134.

In the illustrated embodiment, the activation mechanism 148 is a post or peg configured to engage the interior 174 of the seal holder 144 to overcome the biasing force of the biasing mechanism 146 to move the seal 142 from the open position (FIG. 8) back to the sealed position (FIG. 7). For example, at some point during closing of the door 132, the opened seal assembly 140 engages the activation mechanism 148 and the activation mechanism 148 pushes the seal holder 144 closed. The point at which the seal assembly 140 engages the activation mechanism 148 may be when the door 132 is very nearly closed. In an exemplary embodiment, the seal holder 144 is pivoted closed about the pivot 178; however, the seal holder 144 may have other closing movements in alternative embodiments. In an exemplary embodiment, the activation mechanism 148 may be adjustable (for example, movable left and right) to adjust the initial point of contact during closing of the door 132 and/or to adjust the position of the activation mechanism 148 relative to the seal holder 144 in the closed position. For example, the activation mechanism 148 may be adjusted to hold the seal holder 144 vertically when the door 132 is closed; however, the seal holder 144 may have other, non-vertical orientations when the door 132 is closed in alternative embodiments.

Figure 9:
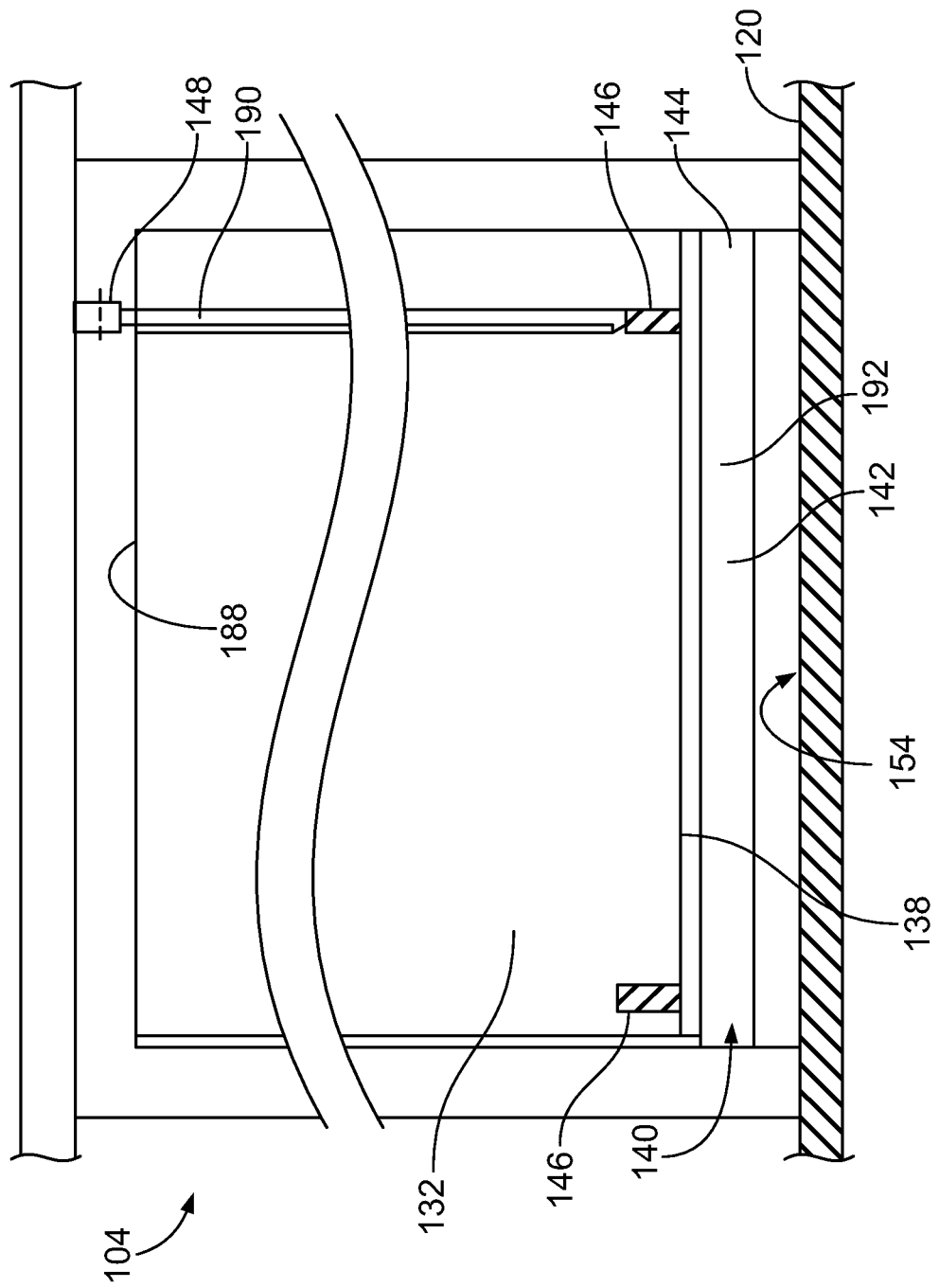
FIG. 9 is a front view of a portion of the galley showing the door in a closed position illustrating the seal assembly in accordance with an exemplary embodiment in a sealed position.

FIG. 9 is a front view of a portion of the galley 104 showing the door 132 in a closed position illustrating an exemplary embodiment of the seal assembly 140 in a sealed position between the bottom 138 of the door 132 and the floor 120. The seal assembly 140 is similar to the embodiments of the seal assembly 140 shown in FIGS. 5-8; however, the seal 142 in the illustrated embodiment is actuated vertically rather than being pivoted. The seal 142 is configured to be movably vertically toward and away from the sealing surface 154 to seal against the floor 120. The biasing mechanisms 146 press upward against the seal holder 144 to apply a biasing force to the seal holder 144 and move the seal 142 away from the sealing surface 154. The seal holder 144 includes one or more rods 190 extending inside the door 132 between the bottom 138 and a top 188 of the door 132. The seal 142 is coupled to a plate 192 of the seal holder 144, which extends the width of the door 132. The biasing mechanism operatively engages the seal holder 144, such as at the plate 192. The activation mechanism 148 operably engages the seal holder 144, such as at the rods 190, to move the seal 142 to the sealed position.

Figure 10:
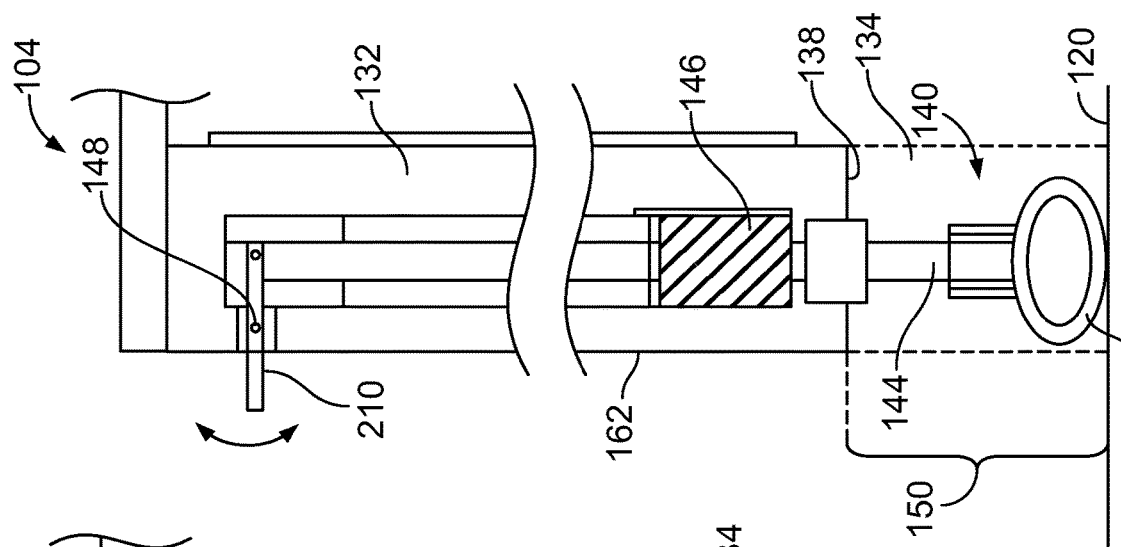
FIG. 10 is a cross-sectional view of a portion of the galley showing the seal assembly in accordance with an exemplary embodiment in a sealed position.
Figure 11:
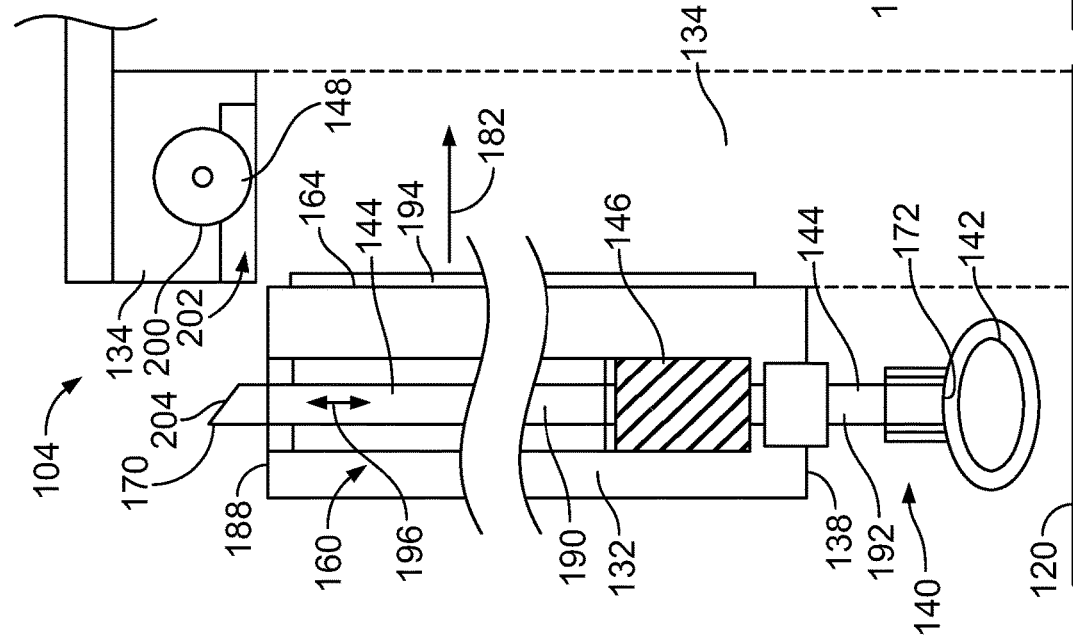
FIG. 11 is a cross-sectional view of a portion of the galley showing the seal assembly shown in FIG. 10 in an open position.

FIG. 10 is a cross-sectional view of a portion of the galley 104 showing the door 132 in the door frame 134 and illustrating the seal assembly 140 in the space 150 between the bottom 138 of the door 132 and the floor 120. In FIG. 10, the door 132 is shown in a closed position and the seal 142 is shown in the sealed position. FIG. 11 is a cross-sectional view of a portion of the galley 104 showing the door 132 in a partially opened or partially closed position showing the seal 142 in an open position.

In the illustrated embodiment, the top 170 of the seal holder 144 extends to the top 188 of the door 132. The seal holder 144 extends through the cavity 160 of the door 132 such that the top 170 protrudes above the top 188 of the door 132 and the bottom 172 protrudes below the bottom 138 of the door 132. For example, the rod 190 extends between the top 188 and the bottom 138 of the door 132 and the plate 192 of the seal holder 144 is provided at the bottom 138. The seal 142 is coupled to the plate 192. The seal holder 144 is movable within the cavity 160 in a vertical direction to change the position of the seal 142 relative to the floor 120. In an exemplary embodiment, because the seal 142 is moved away from the floor 120 to the open position (FIG. 11) when the door 132 is opened and closed, the seal 142 does not drag along the floor 120 during opening and closing of the door 132. As such, the seal 142 is not susceptible to wear as is problematic with conventional blade seals and brush seals. An access panel 194 may be provided, such as at the rear wall 164 for accessing the biasing mechanism 146 and/or the seal holder 144 for adjustment or repair.

The biasing mechanism 146 is coupled to the door 132 in the cavity 160 and is biased against the seal holder 144. The biasing mechanism 146 is used to open the seal assembly 140 by moving the seal holder 144 and the seal 142 upward to the open position (FIG. 11) by applying a biasing force to the seal holder 144. The seal holder 144 may only be lifted a short distance to lift the seal 142 off of the floor 120 to prevent dragging and wear. The biasing mechanism 146 is configured to apply the biasing force in a vertical direction 196 perpendicular to the door opening direction 180 and the door closing direction 182. The biasing mechanism 146 may be provided at any location along the seal holder 144, such as near the bottom 138, near the top 188, or anywhere therebetween. In the illustrated embodiment, the rod 190 extends through the biasing mechanism 146; however the biasing mechanism 146 may be at other locations in alternative embodiments.

The activation mechanism 148 is positioned in the galley 104 to operably engage the seal holder 144, such as to close the seal assembly 140. In an exemplary embodiment, the activation mechanism 148 is coupled to the door frame 134 above the door 132. The activation mechanism includes a roller 200 positioned in a pocket 202 in the door frame 134. When the door 132 is closed or being closed, the roller 200 engages the seal holder 144. For example, a distal end of the rod 190 includes a ramp 204. As the door 132 is closed, the ramp 204 engages the roller 200 and the roller 200 forces the seal holder 144 downward to overcome the biasing force of the biasing mechanism 146. As such, the seal assembly 140 may be automatically actuated when the door 132 is closed. Closing of the door 132 causes the seal 142 to move to the sealed position. No other user intervention or manipulation is needed to close the seal 142. The roller 200 forces the seal 142 to move from the open position (FIG. 11) back to the sealed position (FIG. 10). The angle of the ramp 204 and the distance the ramp 204 moves along the roller 200 determine the amount of vertical movement of the seal assembly 140. In an exemplary embodiment, the activation mechanism 148 may be adjustable (for example, movable left and right and/or movable up and down) to adjust the initial point of contact during closing of the door 132 and/or to adjust the position of the activation mechanism 148 relative to the seal holder 144 in the closed position.

Figure 12:
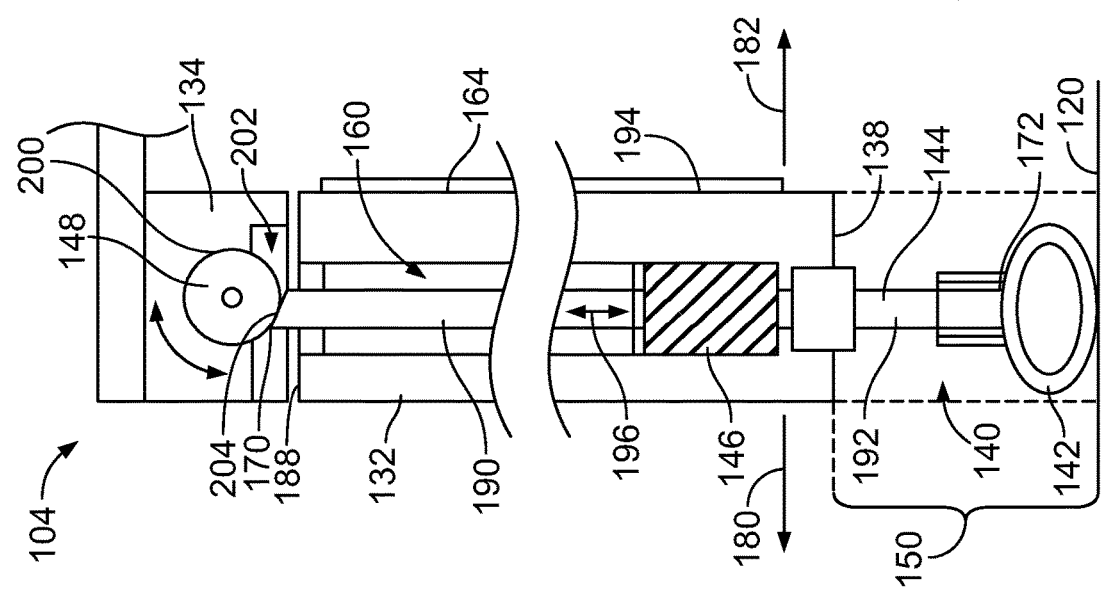
FIG. 12 is a cross-sectional view of a portion of the galley showing the seal assembly in accordance with an exemplary embodiment in a sealed position.

FIG. 12 is a cross-sectional view of a portion of the galley 104 showing the door 132 in the door frame 134 and illustrating the seal assembly 140 in the space 150 between the bottom 138 of the door 132 and the floor 120. The seal assembly 140 is similar to the embodiments of the seal assembly 140 shown in FIGS. 9-11; however, the activation mechanism 148 is manually actuated rather than being automatically actuated when the door closes. In FIG. 12, the door 132 is shown in a closed position and the seal 142 is shown in the sealed position.

In the illustrated embodiment, the activation mechanism 148 includes a handle 210 accessible at the front wall 162 of the door 132. The handle 210 is configured to be actuated to open and/or close the seal assembly 140. For example, the handle 210 may be lifted up/down or pushed/pulled to move the seal holder 144. In an exemplary embodiment, the seal holder 144 is movable vertically relative to the door 132 to lift the seal 142 to the open position and then compress the seal 142 downward against the floor 120 to the sealed position.

A seal assembly for a galley is provided for an aircraft that seals against a sealing surface of the galley, which may be against the floor or against another surface, such as part of the door frame of the galley. For example, the seal at the seal edge is configured to seal against the door frame between the floor and the bottom of the door to prevent side leakage. The seal is movable to an open position and held in the open position as the door is opened and closed to prevent damage and wear to the seal. In various embodiments, the seal is movably coupled to the door and moved between an open position and a sealed position. In other various embodiments, the seal is movably coupled to the door frame and moved between an open position and a sealed position, such as by the opening and closing action of the door. A more compliant seal can be used, which provides better, more efficient sealing than conventional blade seals or brush seals because the seal is not subjected to wear and tear during opening and closing of the door. Various embodiments of the seal assembly provide a biasing mechanism to hold the seal open and an activation mechanism to close the seal when the door is closed. In various embodiments, the activation mechanism automatically closes the seal by closing the door and automatically opens the seal by opening the door.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A seal assembly for use with a door within a door frame of a galley of an aircraft, the seal assembly comprising:
   a seal having a seal interface at an outer surface, the seal being configured to be movably coupled to the door, the seal being compressible to seal the seal interface of the seal against a sealing surface at a floor of the galley, the seal interface forming a continuous seal against the floor of the galley;
   a seal holder holding the seal;
   a biasing mechanism coupled to the seal holder, the biasing mechanism configured to hold the seal in an open position by applying a biasing force to the seal holder, wherein the biasing mechanism applies the biasing force in a door opening direction, the biasing mechanism rotating the seal holder and the seal inwardly away from the door opening direction; and
   an activation mechanism operably coupled to the seal holder, the activation mechanism configured to overcome the biasing force to move the seal from the open position to a sealed position, the outer surface being deformed in the sealed position when the seal interface is sealed against the sealing surface at the floor of the galley to form the continuous seal against the floor of the galley
   wherein the seal is aligned with and contained within the door frame in the sealed position, the seal interfacing with the door frame to seal against the door frame and prevent side leakage between the seal and the door frame.

2. The seal assembly of claim 1, wherein the seal interface includes a bottom seal interface at a bottom of the seal forming the seal against the floor of the galley, and wherein the seal includes a side seal interface at a side of the seal to seal against the door frame, the seal holder positioning the seal below a bottom of the door.

3. The seal assembly of claim 1, wherein the seal includes a side seal interface at a side edge of the seal, the seal holder positioning the side seal interface at the door frame below a bottom of the door.

4. The seal assembly of claim 1, wherein the seal holder is configured to be pivotably coupled to the door and rotated between the open position and the sealed position, the seal being moved toward the sealing surface to the sealed position to engage the sealing surface and being moved away from the sealing surface until the seal is lifted off of the sealing surface and free to move relative to the sealing surface to avoid wearing of the seal as the seal holder is pivoted.

5. The seal assembly of claim 1, wherein the seal holder is configured to be linearly actuated between the open position and the sealed position in a direction perpendicular to a seal interface of the seal.

6. The seal assembly of claim 1, wherein the seal holder includes a hinge, the seal holder being rotated about the hinge.

7. The seal assembly of claim 1, wherein the biasing mechanism is contained within an interior of the door, the seal holder includes a top and a bottom, the seal extending from the seal holder below the bottom to seal against the sealing surface at the floor of the galley, the activation mechanism configured to extend into the interior of the door for operably engaging the seal holder proximate to the top.

8. The seal assembly of claim 1, wherein the seal holder includes a top and a bottom, the seal extending from the seal holder below the bottom to seal against the sealing surface at the floor of the galley, the activation mechanism operably engaging the seal holder proximate to the bottom.

9. The seal assembly of claim 1, wherein the seal holder is permanently fixed to the activation mechanism, the seal holder and the activation mechanism moving with the door as the door opens and closes.

10. The seal assembly of claim 1, wherein the seal holder is separable from the activation mechanism as the door opens, the seal holder moving with the door as the door opens and closes, the activation mechanism remaining fixed to the door frame as the door opens and closes.

11. The seal assembly of claim 1, wherein the seal is lifted off a sealing surface as the seal is moved to the open position and is held in the open position as the door is opened and closed, the activation mechanism causing the seal to move to the sealed position as the door is closed.

12. The seal assembly of claim 1, wherein the activation mechanism includes a handle accessible at a front of the door operated by a user to move the seal from the open position to the sealed position.

13. A galley door received within a door frame of a galley of an aircraft, the galley door comprising:
   a door body having a front wall for facing a galley space exterior of the galley, a rear wall for facing a galley cart compartment of the galley, and a bottom for facing a floor of the galley space; and
   a seal assembly provided at the bottom of the door body, the seal assembly comprising a seal holder and a seal coupled to the seal holder, the seal having a seal interface at an outer surface, the seal being compressible to seal the seal interface of the seal against a sealing surface at a floor of the galley, the seal interface forming a continuous seal against the floor of the galley, the seal holder being movably coupled to the door body, the seal assembly comprising a biasing mechanism coupled to the seal holder configured to hold the seal in an open position by applying a biasing force to the seal holder, the seal assembly comprising an activation mechanism operably coupled to the seal holder configured to overcome the biasing force to move the seal from the open position to a sealed position, the activation mechanism including a handle accessible at a front of the door operated by a user to move the seal from the open position to the sealed position, the outer surface being deformed in the sealed position when the seal interface is sealed against the sealing surface at the floor of the galley to form the continuous seal against the floor of the galley wherein the seal is aligned with and contained within the door frame below the bottom of the door body in the sealed position, the seal interfacing with the door frame to seal against the door frame and prevent side leakage between the seal and the door frame.

14. The galley door of claim 13, wherein the door body includes a cavity between the front wall and the rear wall, the seal holder being received in the cavity.

15. The galley door of claim 13, wherein the door body includes a cavity between the front wall and the rear wall, the biasing mechanism being received in the cavity.

16. The galley door of claim 13, wherein the door body includes a cavity between the front wall and the rear wall, the activation mechanism being received in the cavity.

17. The galley door of claim 13, wherein the seal holder is configured to be pivotably coupled to the door body and rotated between the open position and the sealed position, the seal being moved toward the sealing surface to the sealed position to engage the sealing surface and being moved away from the sealing surface until the seal is lifted off of the sealing surface and free to move relative to the sealing surface to avoid wearing of the seal as the seal holder is pivoted.

18. The galley door of claim 13, wherein the seal holder is configured to be linearly actuated between the open position and the sealed position in a direction generally parallel to the front wall and the rear wall.

19. The galley door of claim 13, wherein the biasing mechanism applies the biasing force to move the seal forward of the front wall in the open position.

20. The galley door of claim 13, wherein the biasing mechanism applies the biasing force to move the seal rearward of the rear wall in the open position.

21. The galley door of claim 13, wherein the biasing mechanism applies the biasing force to move the seal toward the bottom of the door body as the seal is moved from the sealed position to the open position.

22. The galley door of claim 13, wherein the seal holder is separable from the activation mechanism as the door body opens, the seal holder moving with the door body as the door body opens and closes, the activation mechanism remaining fixed to the door frame as the door body opens and closes, the seal holder engaging the activation mechanism as the door body is being closed to automatically move the seal holder to the sealed position as the door body is being closed.

23. The galley door of claim 13, wherein the biasing mechanism applies the biasing force in a door opening direction, the biasing mechanism rotating the seal holder and the seal inwardly away from the door opening direction.

24. A galley for an aircraft comprising:
a cart compartment configured to be cooled;
a door frame defining a front wall of the cart compartment;
a door coupled to the door frame at a hinge, the door having a bottom for facing a floor of the galley; and
a seal assembly provided at the bottom of the door, the seal assembly comprising a seal holder and a seal coupled to the seal holder, the seal having a seal interface at an outer surface, the seal being compressible to seal the seal interface of the seal against a sealing surface at a floor of the galley, the seal interface forming a continuous seal against the floor of the galley, the seal holder being movably coupled to the door, the seal assembly comprising a biasing mechanism coupled to the seal holder configured to hold the seal in an open position by applying a biasing force to the seal holder, the seal assembly comprising an activation mechanism operably coupled to the seal holder configured to overcome the biasing force to move the seal from the open position to a sealed position, the activation mechanism including a handle accessible at a front of the door operated by a user to move the seal from the open position to the sealed position, the outer surface being deformed in the sealed position when the seal interface is sealed against the sealing surface at the floor of the galley to form the continuous seal against the floor of the galley wherein the seal is aligned with and contained within the door frame in the sealed position, the seal interfacing with the door frame to seal against the door frame and prevent side leakage between the seal and the door frame.

25. The galley of claim 24, wherein the activation mechanism is coupled to the door frame, the door and seal holder being movable relative to the activation mechanism as the door is opened and closed, the seal holder engaging the activation mechanism as the door is being closed to automatically move the seal holder to the sealed position as the door is being closed.

26. The galley of claim 24, wherein the biasing mechanism applies the biasing force in a door opening direction, the biasing mechanism rotating the seal holder and the seal inwardly away from the door opening direction.

27. A method of assembling a galley with a seal assembly including a seal holder, a seal coupled to the seal holder having a a seal interface at an outer surface of the seal, and a biasing mechanism coupled to the seal holder, the method comprising:
coupling a door to a door frame above a floor of the galley to close a galley cart compartment, the door being configured to be opened and closed;
coupling the seal holder to a bottom of the door such that the seal is configured to seal against the floor, the seal holder causing the seal to be compressible to seal the seal interface of the seal against a sealing surface at the floor of the galley, the seal interface forming a continuous seal against the floor of the galley;
coupling the biasing mechanism to the door and to the seal holder to hold the seal in an open position by applying a biasing force to the seal holder, the biasing mechanism applying the biasing force in a door opening direction and rotating the seal holder and the seal inwardly away from the door opening direction; and coupling an activation mechanism proximate to the door frame to interact with the seal holder to overcome the biasing force to move the seal from the open position to a sealed position against the floor, the outer surface being deformed in the sealed position when the seal interface is sealed against the sealing surface at the floor of the galley to form the continuous seal against the floor of the galley, wherein the activation mechanism positions the seal within the door frame in the sealed position to interface and seal the seal against the door frame and prevent side leakage between the seal and the door frame.

28. The method of claim 27, wherein the seal holder is pivotably coupled to the door at a pivot and the biasing mechanism is coupled to the seal holder to rotate the seal holder to the open position, the seal being moved toward the sealing surface to the sealed position to engage the sealing surface and being moved away from the sealing surface until the seal is lifted off of the sealing surface and free to move relative to the sealing surface to avoid wearing of the seal as the seal holder is pivoted.

29. The method of claim 27, wherein the activation mechanism is coupled to the door frame and is configured to engage the seal holder when the door is closed to automatically move the seal to the sealed position by closing action of the door when the door is closed.

30. The method of claim 27, wherein said coupling the seal holder to the bottom of the door comprises coupling the seal holder to the bottom of the door such that a side edge of the seal is configured to seal against the door frame between the floor and the bottom of the door.

31. The method of claim 27, wherein the activation mechanism includes a handle accessible at a front of the door operable by a user to move the seal from the open position to the sealed position.

* * * * *